United States Patent [19]

Hines

[11] Patent Number: 5,054,279
[45] Date of Patent: Oct. 8, 1991

[54] WATER SPRAY EJECTOR SYSTEM FOR STEAM INJECTED ENGINE

[75] Inventor: William R. Hines, Cincinnati, Ohio

[73] Assignee: General Electric Company, Cincinnati, Ohio

[21] Appl. No.: 652,234

[22] Filed: Feb. 5, 1991

Related U.S. Application Data

[63] Continuation of Ser. No. 434,627, Nov. 9, 1989, abandoned, which is a continuation of Ser. No. 126,090, Nov. 30, 1987, abandoned.

[51] Int. Cl.⁵ ............................................ F02G 3/00
[52] U.S. Cl. ................................ 60/39.05; 60/39.53; 60/39.59
[58] Field of Search ............. 60/39.05, 39.53, 39.54, 60/39.55, 39.58, 39.59, 39.3

[56] References Cited

U.S. PATENT DOCUMENTS

| | | | |
|---|---|---|---|
| 996,324 | 6/1911 | DeFerranti | 60/39.55 |
| 1,278,314 | 9/1918 | Dix | 60/39.55 |
| 3,021,673 | 2/1962 | Mock | 60/39.55 |
| 3,038,308 | 6/1962 | Fuller | 60/39.55 |
| 3,238,719 | 3/1966 | Harslem | 60/39.55 |
| 3,280,555 | 10/1966 | Charpentier et al. | 60/39.53 |
| 3,747,336 | 7/1973 | Dibelius et al. | 60/39.55 |
| 3,785,146 | 1/1974 | Bailey et al. | 60/39.53 |
| 4,128,994 | 12/1978 | Cheng | 60/39.05 |
| 4,509,324 | 4/1985 | Urbach et al. | 60/39.55 |
| 4,569,195 | 2/1986 | Johnson | 60/39.3 |
| 4,631,914 | 12/1986 | Hines | 60/39.05 |
| 4,680,927 | 7/1987 | Cheng | 60/39.3 |

FOREIGN PATENT DOCUMENTS

| | | |
|---|---|---|
| 81995 | 6/1983 | European Pat. Off. . |
| 86504 | 8/1983 | European Pat. Off. . |
| 184137 | 6/1986 | European Pat. Off. . |
| 209820 | 1/1987 | European Pat. Off. . |
| 275121 | 7/1988 | European Pat. Off. . |
| 3419560 | 11/1984 | Fed. Rep. of Germany . |
| 2092741 | 1/1972 | France . |
| 35108 | 3/1980 | Japan .............................. 60/39.55 |
| 81127 | 5/1982 | Japan .............................. 60/39.55 |
| 214607 | 12/1983 | Japan .............................. 60/39.55 |
| 39936 | 3/1984 | Japan .............................. 60/39.53 |
| 248309 | 4/1947 | Switzerland ................... 60/39.53 |
| 2187273 | 9/1987 | United Kingdom . |

OTHER PUBLICATIONS

The Combined Reheat Gas Turbine/Steam Turbine Cycle—Part I and Part II by L. G. Rice; ASME publication, Paper No. 79-GT-7; 79-GT-8; pp. 1-7 and 1-8; respectively.

Primary Examiner—Louis J. Casaregola
Assistant Examiner—Timothy S. Thorpe
Attorney, Agent, or Firm—Jerome C. Squillaro; James P. Davidson

[57] ABSTRACT

A steam injected engine, including a compressor, a combustor and a turbine in series combination, with a gas flow path passing therethrough. A steam injection system is provided for adding superheated steam to the gas flow path. A water spray and mixer system sprays water into the steam injection system, whereby the water is immediately vaporized and the resultant mixture remains at superheated temperatures but a greater mass flow of steam is provided to the gas engine to thereby produce an increase in the power output from the engine at reduced thermal efficiency. This new system also provides a means for introducing external waste heat or waste steam into current engine steam piping.

11 Claims, 2 Drawing Sheets

WATER SPRAY EJECTOR SYSTEM FOR STEAM INJECTED ENGINE

This is a continuation of application Ser. No. 434,627, filed Nov. 9, 1989, now abandoned, which is a continuation of application Ser. No. 126,090, filed Nov. 30, 1987, now abandoned.

BACKGROUND OF THE INVENTION

This invention relates to steam injected gas turbine engines, and, more particularly, to apparatus and methods for augmenting steam injection with water injection to thereby increase the power output of the steam injected gas turbine engine.

Steam injected gas turbine engines are known which use gas flowing therethrough following a Brayton Cycle and also having steam flowing therethrough which follows a Rankine Cycle. Frequently, aircraft derivative engines are used for such steam injected engines. The aircraft engine is modified to include an output power turbine, as well as additional fixed recuperative boilers at its output. The recuperative exhaust boilers provide the steam for injection into various locations of the engine, and especially to the combustor. While the steam could also be supplied from an external source, generally, the steam injected gas turbine engine is supplied with steam from its own exhaust boiler system.

One limitation on power output of the steam injected engine is that the steam from its own fixed boilers may not be of adequate low superheat to allow the gas turbine to run to its maximum capability. For example, the combustors could probably take more water vapor both in its dome and in its bypass diluent air which flows from the compressor discharge. However, because of the presence of the steam injection lines flowing into the combustor, there is no possibility provided for further water augmentation to the combustor to increase the amount of water vapor.

SUMMARY OF THE INVENTION

It is, accordingly, an object of the present invention to provide a steam injected gas turbine engine which avoids the aforementioned problems of prior art steam injected engines.

Another object of the present invention is to provide means for augmenting the steam in a steam injected engine with water injection.

Still a further object of the present invention is to provide a method of adding to the amount of water vapor in the combustor of a gas turbine engine in order to increase the power output of the engine.

Another object of the present invention is to provide a water ejector and mixer system for adding water to the steam injection system of a steam injected gas turbine engine.

Yet another object of the present invention is to provide versatility in using boiler available or standing hardware with a derivative engine system of different or uprated exhaust flow parameters. The delivered highly superheated steam can be water injected to create more steam and maximize engine power output.

A further object of the present invention is to provide versatility in using its boiler hardware in that water injection in the steam lines can match power requirements; i.e., more water injection gives more power at lower thermal efficiency, less water injection could match lower power requirements at higher thermal efficiency. This assumes that the boilers have capability to deliver highly superheated steam when installed either as an engine's recuperator or as an external source installation.

A still further object of the present invention is to allow an engine system which is matched to its recuperative boilers which are delivering low superheat steam for maximum power, to also utilize an available external heat source to superheat that steam so that water injection could then be used to increase engine system power output further by generating more steam.

Yet a further object of the present invention is to provide a system for adding additional steam to the combustor of a steam injected engine in order to increase the power output of the engine.

Briefly, in accordance with the present invention, there is provided a system for increasing the power output of a steam injected gas turbine engine. The engine includes a compressor, a combustor, and a turbine in series combination having, a gas flow path passing through the engine. A steam injection system is provided, which injects superheated steam into the gas flow path. There is also included a system for spraying water into the steam injection system, whereupon the water is evaporated by the superheated steam in the steam injection system and mixed with the steam such that the product is still superheated steam, but there results an increased mass flow of such superheated steam which is injected into the gas flow path.

In an embodiment of the invention, the steam injection system including a water spray ejector and mixer, is directed to the bleed ports, which then flow into the combustor shell. In another embodiment of the invention, the steam injection system with the water spray ejector and mixer is directed into the fuel port to increase the water vapor provided to the dome of the combustor.

In addition to providing a water ejector and mixer system for water augmentation into the combustor, water augmentation can also be provided to other steam lines in the engine, such as, a high pressure turbine, a low pressure turbine, or even a power turbine.

This invention is useful when a recuperative boiler system is delivering superheated steam several hundred degrees above saturation temperature at a given pressure to the engine or when the steam is from an external source also at high superheated temperature levels. It will allow engines using mis-matched boilers (not at minimum superheat for maximum power output) to attain that maximum power output within engine redline or limiting operational parameters, whether these boilers are its own recuperation system or are external source boilers. Recuperative boilers delivering steam at +50° F. superheat at a given pressure to an engine could utilize this concept if the steam lines were routed to an external available heat source which could superheat steam to allow downstream water injection in those steam lines. Thus, standing boiler systems could be adapted for use with derivative steam injection engines wherein water pumps could provide the required pressure and flow and the boiler heat transfer surfaces could generate a level of superheated steam. This system could then be augmented by steam line water injection to maximize the engine system power output within operational limits.

The aforementioned objects, features and advantages of the invention will, in part, be pointed out with partic-

BRIEF DESCRIPTION OF THE DRAWING

In the drawing.

In the various figures of the drawing, like reference characters designate like parts.

DESCRIPTION OF THE PREFERRED EMBODIMENT

Figure 1:
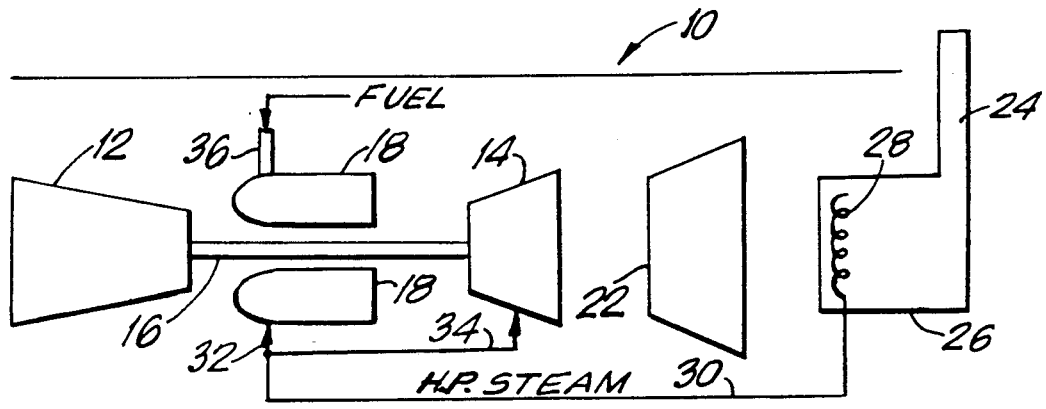
FIG. 1 is a schematic drawing of a steam injected gas turbine engine with the steam being supplied from recuperative exhaust boilers, at the output of the engine.

Referring now to FIG. 1, there is generally shown a steam injected engine 10 including a core engine comprising compressor 12, coupled to turbine 14, through an interconnecting shaft 16. A burner or combustor system 18 is provided between the compressor and the turbine. The core engine is enclosed within a casing 20. The core engine could typically be an aircraft derivative engine.

An output power turbine 22 is aerodynamically connected to the core engine for extracting the power output from the engine. A mixture of air and steam from the engine is exhausted through the exhaust stack 24. Included in the exhaust system 26 are recuperative exhaust boilers 28 which supply high pressure steam 30 for injection back into the engine. The injection can be fed into various locations, such as, the combustor as shown at 32, or into the vanes of any of the turbines as shown at 34. The fuel line is shown at 36 entering the combustor.

The steam injection is generally limited by the supply provided from the fixed boilers. Although steam could also be supplied from an external source, in most cases, the supply comes directly from the fixed boiler system in order to enhance the efficiency of the engine. Nevertheless, external waste steam or heat will also improve engine system thermal efficiency.

The amount of steam that can be injected into the combustor is limited to a flame dome steam or water to fuel ratio of about 2.75, or slightly higher, dependent upon the design. Above this ratio, the flame will generally quench. The steam injected into the combustor is generally sized to control nitrous oxide (NOX) emissions. Such steam is typically provided into the fuel ports being sent into the dome of the combustor. Typically, a dual flow nozzle system is used with the fuel being provided in the center and the steam being provided coaxially around the fuel port.

The engine is also typically provided with bleed ports. Such bleed ports are normally used in the aircraft engine for extracting air for use within the cabin of the aircraft. In the case of the derivative engine used as a steam injected engine, the bleed ports are used for injection of steam. These bleed ports are sized to take as much steam as possible with minimum pressure losses.

Generally, the amount of steam that is provided to the steam injected engine is less than that which the turbine engine could use to maximum capability, the amount of steam being generally limited by the amount of steam available from the fixed boiler system. Even when additional external steam could be provided, the cost of such additional steam is such as would not be worthwhile to provide further enhancement to the engine, except if it were waste steam anyway.

While water augmentation could be provided, the gas turbine is not provided with means for such water augmentation, since the steam injection lines are being used into the combustor and bleed ports of the engine.

The present invention provides for such water augmentation by spraying the water into the steam injection lines, rather than providing water augmentation directly into the combustor. The water is added into the steam lines and immediately is converted into a water vapor. The water vapor and the steam mix, such that the total product remains superheated steam of at least 50° superheat temperature. Such increase in the mass flow of the superheat steam is then introduced into the combustor or other locations within the gas turbine.

The increased mass flow of the superheat steam could be added at various locations in order to feed the combustor. It could be added to the fuel port and thereby injected into the dome, whereby the amount of steam could be increased up to the limit of about 2.75/1 ratio of water to fuel. The increased mass of water could also be added to the bleed port superheat steam, up to a limit of less than 100% relative humidity in the combustor bypass diluent air after mixing. This preceding statement also applies to steam line water injection at other non-combustion ports within the engine, i.e., at least +50° F. superheat for the mixture must exist at local pressures.

The result of the injection of water into the steam lines is to increase the amount of steam in the system. This will result in a power output increase due to the added mass flow. Although there will be an overall thermal efficiency loss, the power augmentation will substantially reduce the cost per kilowatt output of the system.

The thermal efficiency loss will result from the fact that the heat of vaporization of the water at the high pressures cannot be recovered in the exhaust system. Additional loss of thermal efficiency could also result if enough water is added to the fuel port system whereby the combustion efficiency is decreased.

Preferably, the first place to add the water injection would be at the bleed ports. Additionally, the water injected into the steam could be introduced into the fuel port if combustion efficiency is not decreased.

Figure 2:
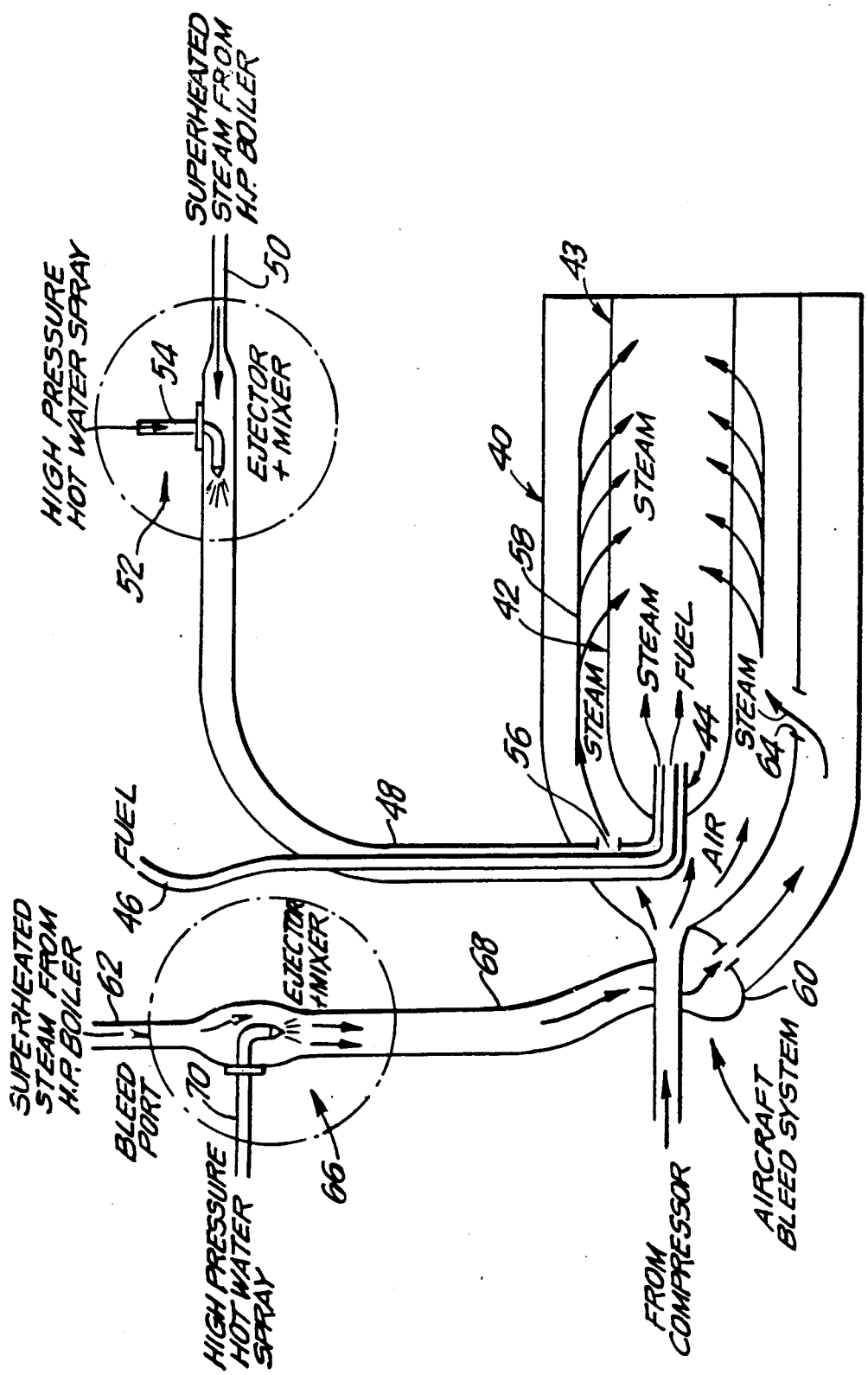
FIG. 2 is a schematic drawing of the water spray ejector system of the present invention added to the steam injection system for providing water augmentation to the combustor of the engine.

Referring to FIG. 2, there is shown schematically a combustor 40 having a dome 42 into which is injected fuel and steam from a dual flow nozzle 44. The fuel is injected from the central passageway 46 with the outer coaxial passageway 48 providing the steam. The steam is superheated and comes from the high pressure fixed boiler system at its output of the engine and enters the steam injection lines at 50.

Along the steam lines 48, there is provided a water ejector and mixer system, shown generally at 52. The ejector and mixer system 52 includes an inlet pipe 54 in which high pressure, hot water is sprayed directly into the superheated steam pipe 48. The hot water is immediately vaporized and mixed with the steam flowing in the pipe, whereby the resultant will also be superheated steam of at least 50° superheat. However, there will be an increase in the mass flow of the steam. The steam is sent along the pipes 48 for injection into the dome.

An auxiliary outlet 56 can be provided along the passageway 48 whereby some of the steam also flows around the dome in the shell along lines 58 for ultimate passage into the liner 43 for yet further dilution.

In addition to providing an ejector and mixer in the steam lines 48 sent to the dome, an ejector and mixer of the present invention can also be provided in the steam injection lines feeding into the bleed system. Specifically, the aircraft bleed system includes a portion 60 surrounding the combustor 40. Superheated steam from the high pressure boiler is provided into the bleed port 62 of the bleed system for passage through the bleed system and through the inlet 64 into the combustor shell. The high pressure, hot water ejector and mixer 66 is added to the steam lines 68 feeding into the bleed system. The hot water is sprayed into the system through the inlet tube 70 and, again, immediately vaporized, whereby the resultant steam will be at least 50° superheat. This increased flow of steam is sent to the bleed system for passage into the combustor liner.

By way of example, typically, an engine running on fixed boilers or external source boilers at high superheat and holding NOX emissions could take another 2% of water into the fuel port and another 2.5% into the bleed ports. This could increase the power output by about 28% at a loss in thermal efficiency of about −1.4 points, when the low pressure turbine inlet temperature is held constant and no other engine limits are restrictive.

The water that is added should be about 70 micron size or smaller droplets, which would immediately evaporate in the superheated steam. The use of such sized droplets avoids any erosion problem on the blades of the turbine or the combustor proper.

The amount of water added can be as much as will evaporate. Typically, this should be up to a limit of less than 100% humidity locally at the static pressure of the point at which the steam is injected into the air. The resultant of the water vapor and the existing steam should be superheat steam of at least 50° superheat of the total mix of the steam.

The advantage of injecting water in the steam pipes is that the added water will almost immediately vaporize and enter the combustor as a vapor and not as droplets. Furthermore, it is the only way additional water can be added to the fuel dome, since both the fuel and steam are delivered by dual flow nozzles. An additional feature is that now water can also be added to the bypass diluent flow from the compressor, since it will enter as a vapor. Previous water augmentation systems only added water to the combustor dome area and did so directly to the combustor.

The water injection system could be used to deliver external source steam of at least +50° F. superheat so as to mix with steam (s) coming from its own recuperative boilers. Thus, waste steam would be introduced to the engine system using available piping which would increase both power output and thermal efficiency. The thermal efficiency result for the waste steam would be about 0.15 for that part which would have been wasted.

Figure 3:
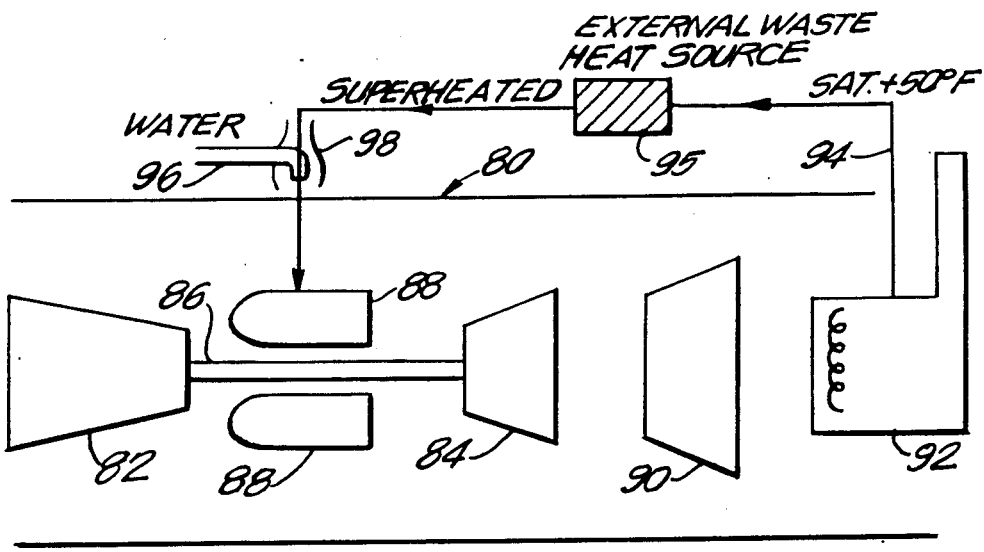
FIG. 3 is a schematic drawing of a steam injected gas turbine engine using an external source of heat to add superheat temperature to the output from the engine boilers such that additional water augmentation can be provided into the water spray ejector lines feeding the steam ejection system.

Referring now to FIG. 3, there shown generally an engine 80 including a compressor 82 interconnected to a turbine 84 by means of a shaft 86. Combustors 88 are placed between the compressor and the turbine. An output power turbine 90 is aerodynamically connected to the core engine for extracting the power. A recuperative boiler system 92 contained within the output stack is used to provide the steam for injection back into the system along line 94. The steam that is provided is at a temperature of 50 degrees superheat which would normally be adequate for injection into the combustor system. However, in the present case, in order to be able to add additional water augmentation, the steam is initially passed through external waste heat source 95 in order to add additional temperature to the superheated steam. Once additionally superheated, water can now be added at 96 into the water spray ejector device shown generally at 98.

Using this system, additional water augmentation can be provided by making use of external waste heat that might be available for adding heat to the steam coming out of the recuperative boiler of the engine itself.

Figure 4:
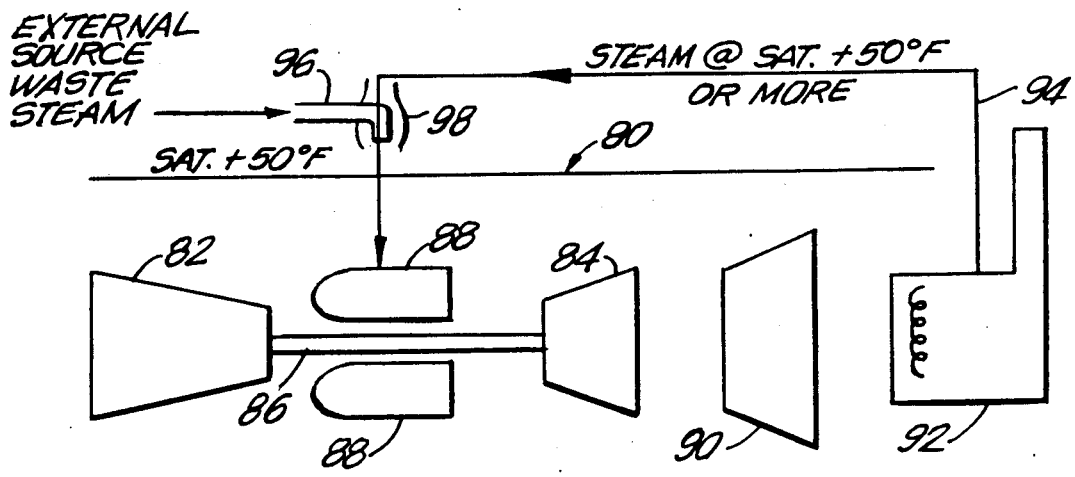
FIG. 4 is a schematic drawing of the steam injected gas turbine engine using an external source of waste steam injected into the steam injection systems for adding steam to the engine.

Referring to FIG. 4, there is again shown the engine of FIG. 3 with like parts identified in a like manner. Here again, steam is provided from the recuperative boiler 92 along line 94. Such steam is at least at a temperature of 50 degrees superheat. In this case, an external source of waste steam also at least 50 degrees superheat is injected into the water spray ejector and mixer system. Instead of supplying water as was shown in FIG. 3 with the water immediately turning into steam, steam directly is provided from an external source.

Because of the availability of the water spray ejector and mixer system of the present invention, either water or steam can be injected to provide augmentation. In this way, the engine can be matched to the desired power requirements. More water injection can be provided in order to give more power at lower thermal efficiency. Less water injection can match lower power requirements at high thermal efficiency.

Although the technique has been shown for use in adding mass flow to the combustor, the technique could also be used to augment power through any steam line into the engine, such as, the steam line to the low pressure turbine or high pressure turbine or the power turbine. Also, any vane steam cooling could be enhanced by adding water spray to that steam, as long as the temperature remains above the saturation temperature at that pressure.

There has been disclosed heretofore the best embodiment of the invention presently contemplated. However, it is to be understood that various changes and modifications may be made thereto without departing from the spirit of the invention.

I claim:

1. A method of increasing the power output of a steam injected gas turbine engine having a compressor, a combustor having a dome which receives fuel and steam from a dual flow nozzle, and a turbine in series combination with a gas flow path passing therethrough, and a system for injection of superheated steam into the gas flow path, the method comprising spraying water into the steam injection system where the water is evaporated by the superheated steam, mixing the evaporated water with the existing steam in the steam injection system so that the resultant steam is at a temperature of at least 28 degrees celcius (50 degrees fahrenheit) superheat and additional steam is added to the dome from the fuel nozzle to obtain a resultant increased mass flow of superheated steam mixture for injection into the gas flow path, and controlling the amount of water sprayed into the steam injection system to maximize the mass flow of superheated steam without quenching the flame.

2. The method as in claim 1, wherein the water sprayed into the steam injection system is less than 70 micron size droplets.

3. The method as in claim 1, wherein the amount of water sprayed into said steam injection system is such that the ratio of the steam to fuel in the dome is maintained at about 2.75/1.

4. The method as in claim 1, wherein said gas turbine engine is aeroderivative and the steam injection system feeds a bleed port at an entrance to the combustor, the water is sprayed into the bleed port where the resultant superheated steam from the bleed port mixes with combustor bypass diluent air from the compressor discharge, and the resultant superheated steam is maintained at a maximum level in the diluent air without the forming of condensation.

5. The method as in claim 1, wherein the resultant steam is applied to vanes of the turbine, and the temperature of the resultant steam is above the saturation temperature at the pressure at which it is applied to the vanes.

6. A gas turbine engine comprising in series flow relationship a compressor, a combustor and a turbine, a gas flow path through the engine, a fuel and steam injection system having a dual flow nozzle for providing fuel and steam to the dome of the combustor, and a water spray ejector and mixer means coupled to the dual flow nozzle for spraying water into the superheated steam, wherein the water is vaporized by the superheated steam flowing therein and mixed with the superheated steam to produce a resultant superheated steam mixture of greater mass flow for injection into the gas flow path, said superheated steam mixture having a resultant steam temperature of at least 28 degrees celcius (50 degrees fahrenheit) superheat, the amount of water sprayed into the fuel and steam system being controlled to maximize the mass flow of superheated steam without quenching the flame in the combustor.

7. A gas turbine engine as in claim 6, further comprising an engine bleed system coupled to the gas flow path having a bleed port, said steam and fuel injection system coupled to the bleed port for feeding superheated steam to the gas flow path, said water spray ejector and mixer means is coupled to the bleed system, wherein said bleed system is coupled to the combustor to supply the resultant steam mixture to bypass diluent air in the combustor.

8. A gas turbine engine as in claim 7, wherein said bleed system is coupled to the combustor to supply the resultant steam mixture to bypass diluent air in the combustor.

9. A gas turbine engine as in claim 7, said fuel and steam injection system and said spray water ejector and mixer coupled to vanes in said turbine, whereby the resultant steam mixture is applied to the vanes for cooling.

10. The gas turbine engine of claim 6, further comprising an auxiliary outlet in said fuel and steam injection system location upstream of said dual flow nozzle for providing a portion of the resultant steam around the combustor dome for ultimate passage into a liner for further dilution.

11. The gas turbine engine of claim 6, wherein the amount of water sprayed into said fuel and steam injection system is such that the ratio of the steam to fuel in the dome is maintained at about 2.75/1.

* * * * *